SNOW VEHICLE

Original Filed Aug. 10, 1966 4 Sheets-Sheet 1

INVENTOR.
LAWRENCE R. SMIEJA
BY
Adams & Cuayna
ATTORNEYS

SNOW VEHICLE

Original Filed Aug. 10, 1966 4 Sheets-Sheet 1

INVENTOR
LAWRENCE R. SMIEJA
BY
Adams & Quayna
ATTORNEYS

SNOW VEHICLE

Original Filed Aug. 10, 1966 4 Sheets-Sheet 3

INVENTOR
LAWRENCE R SMIEJA
BY
Adams & Cuayna
ATTORNEYS

SNOW VEHICLE

Original Filed Aug. 10, 1966 4 Sheets-Sheet 4

INVENTOR
LAWRENCE R. SMIEJA
BY
Adams & Cuayna
ATTORNEYS

United States Patent Office

Re. 26,775
Reissued Jan. 20, 1970

26,775
SNOW VEHICLE

Lawrence R. Smieja, Box 50, Rte. 4,
Deephaven, Minn. 55391

Original No. 3,404,745, dated Oct. 8, 1968, Ser. No. 571,572, Aug. 10, 1966. Application for reissue Dec. 17, 1968, Ser. No. 791,817
Int. Cl. B62m *27/00*
U.S. Cl. 180—5 16 Claims

Matter enclosed in heavy brackets [ ] appears in the original patent but forms no part of this reissue specification; matter printed in italics indicates the additions made by reissue.

ABSTRACT OF THE DISCLOSURE

This invention relates generally to a vehicle for traveling on snow or ice and includes a body, a continuous track section mounted within the body, a pair of steering skis on the front end of the body forward of said track section wherein the track section and body provide an arrangement whereby the track section is shiftable upwardly and downwardly from the body section to maintain driving contact with the terrain. The body section normally provides a pair of sides spaced transversely from the track section and having an inwardly depending portion extending therefrom which inward depending portion is directed towards the track section to provide a substantially horizontal flat body section adjacent the track element. This substantially flat section will, upon movement of the track section into the body area, serve as a supporting area for the unit whereby a large support area is provided. The track section is moveable upwardly and downwardly into the body through spring loaded mechanisms and the spring tension promoting this movement is adjustable in accordance with the weight being carried by the unit.

In the past, the general design of vehicles for travel over ice or snow covered terrain has been to provide a continuous track system with a pair of forwardly arranged steering skis. The rider or driver of these vehicles is usually mounted above the track system and in such position presents a center of gravity which is exceedingly high and therefore the unit is easily tipped. Further with the devices presently used, the track systems employed are of the unfloatable or positively positioned variety to produce a ride which is responsive to all differences in terrain and which therefore may be classified as rough. Another further problem with the snow devices presently in use is the exposure of the riders to the elements, who in their position seated above the track device, are exposed to all elements and obtain no covering or protection from the elements except for the clothing they wear.

The device provided by applicant, however, eliminates many of these difficulties and in addition provides a unit which is substantially low in profile and compact in nature to produce an appealing unit. The low profile of the unit is obtained by providing a floating type track mechanism which is housed generally within the unit itself and wherein the compartment for passengers encloses at least selected portions of the track unit. In other words, the track unit and passenger compartment are integral portions to make the best utilization of vertical height.

The unit provided by applicant provides a substantially enclosed passenger compartment which due to its particular design provides a certain buoyancy when riding over deep, snow-covered ground. The passenger compartment's lower edge actually acts as an additional pair of skis arranged adjacent to the track system and extending parallel therealong such that the entire weight of the unit is not borne solely by a track and ski system but is rather borne by a track, ski and carrying ski concept.

Another important advantage of applicant's device is the free floating track system which is arranged to float in response to the weight of the vehicle and in response to the type of terrain being traversed. The floating track mechanism is adjustable with respect to the weight being carried by the vehicle and therefore a comfortable ride may be attained even though several persons are carried by the vehicle.

It is therefore an object of applicant's invention to provide a new and unique vehicle for traveling over snow or ice covered terrain which includes a specific design to carry portions of the weight of the unit without relying entirely on a track and ski system.

It is a further object of applicant's invention to provide a snow vehicle or the like having a spring loaded track mechanism such that the track is always maintained in positive ground contact position and which is further adjustable in accordance with the amount of weight being carried by the unit.

It is still a further object of applicant's invention to provide a snow vehicle or the like which provides a certain degree of shelter to the passengers being conveyed therein due to the design of the passenger compartment.

It is a further object of applicant's invention to provide a snow vehicle or the like wherein a passenger compartment and track mechanism system are integrally arranged in such a manner to provide a low profile for the unit.

These and other objects and advantages of my invention will more fully appear from the following description made in connection with the accompanying drawings, wherein like reference characters refer to the same or similar parts throughout the several views, and in which:

FIG. 8 is a section taken substantially along line 8—8 of FIG. 6.

*In accordance with the accompanying drawings, a snow or ice vehicle embodying the concepts of applicant's invention includes a passenger compartment 11 and a track section each generally designated 12. The passenger compartment includes a metal supporting frame 13 around the passenger receiving compartment which frame extends to and supplies rigidity and support to all of the vehicle's elements.*

Figure 7:
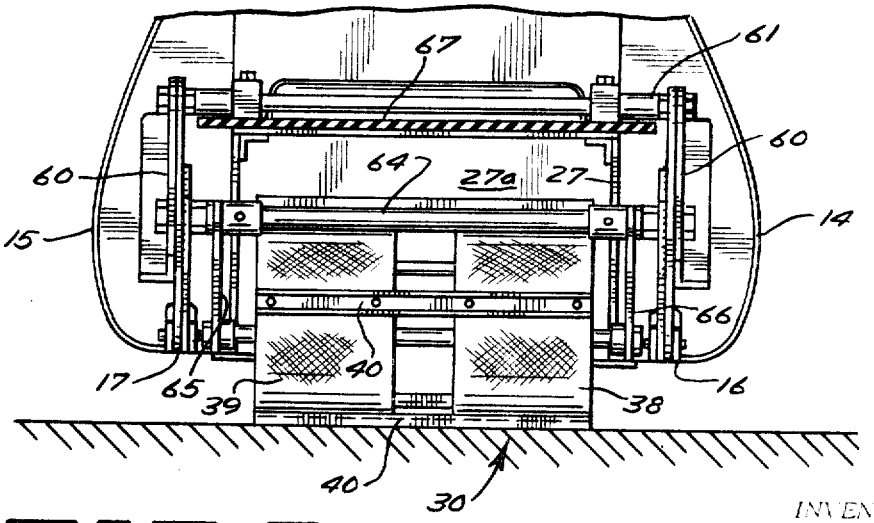
FIG. 7 is a vertical section taken substantially along line 7—7 of FIG. 4.

Exterior body elements of the vehicle include a pair of downwardly depending side members 14–15 which side members entirely enclose the vertical sides of the unit and curve inwardly on the bottom edge thereof as best illustrated in FIG. 7 to provide a pair of substantially horizontally disposed longitudinally extending support members 16–17 which members in operation actually serve to carry at least portions of the weight of the vehicle. When the unit is in operation in snow the tracking system will ordinarily be below the surface of the snow and a substantial portion of the weight of the unit will be carried upon these horizontal surfaces 16–17. A pair of steering ski members 19–20 are arranged in generally forwardly spaced relationship upon the unit and these skis are so designed to maintain steerability through various terrain conditions. The ski structure 19–20 is steerably connected to a set of control bars 21 in the upper portion of the passenger compartment 11 unit. For ease of travel over certain terrain situations, the ski structures 19–20 may be provided with wheels **19*a*–20*a*** therein such that it may be possible to steer the unit where the snow or ice is not present such as over open roads and the like.

In the form shown an engine section 25 is arranged forwardly of the steering control member 21 and for this purpose a gasoline engine or the like is utilized to transmit power to the track or driving system 12. For this particular purpose a plurality of gear members 26 may be provided to properly transmit and direct power to the track section 12.

Figure 6:
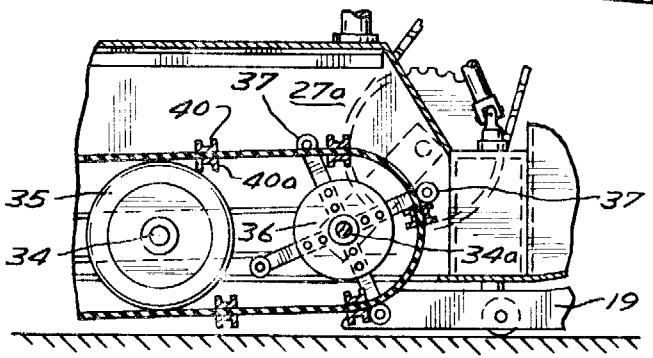
FIG. 6 is a vertical section taken substantially along line 6—6 of FIG. 4.
Figure 6:
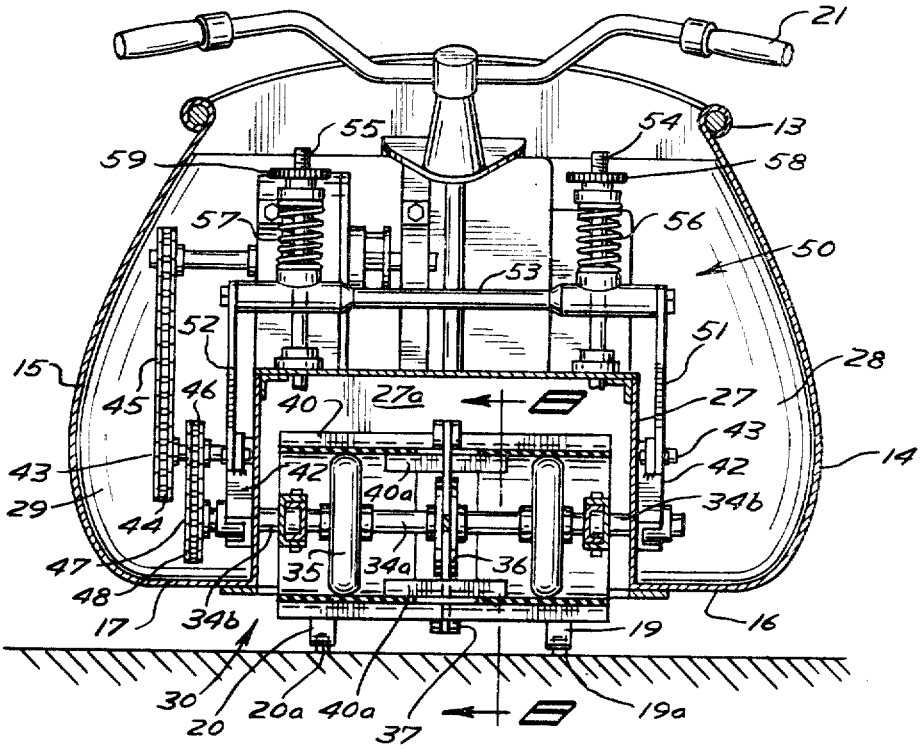

The track section 12 of the unit comprises a generally U-shaped frame and housing member best illustrated in FIG. 6 and generally designated 27 which is open at the bottom thereof and which will provide a generally flat seat portion 28 in the passenger compartment section 11. This unit is so constructed and arranged that there is room for a passenger's legs in cavities 28–29 on either side of the U-shaped housing to facilitate a person's sitting within the unit. By providing a U-shaped structure extending upwardly into the passenger compartment 11 a low profile configuration is obtained due to mounting of the track unit generally designated 30 within the cavity **27*a*** defined of the U-shaped housing.

The track section 30 includes a pair of spaced side supporting beam elements 31–32 extending longitudinally within the U-shaped housing section 27 and includes a plurality of free wheeling wheel sets 33 extending transversely thereacross; each such wheel set including a free rotatable shaft member 34 and a pair of wheel members 35—35 mounted in spaced axial relation thereon. In the form shown, five of such wheel sets are spaced longitudinally along the supporting side elements 31–32 and the frontmost wheel set **33*a* includes at least a four-pronged sprocket member 36 affixedly attached to shaft 34*a* which sprocket 36 is provided with bearing members 37** on the ends of its outwardly extending arms for driving the ground engaging track.

The track mechanism consists of at least a pair of spaced apart continuous belt members 38–39 which belting members are joined at spaced intervals through a cross tread member 40. These cross tread members 40 are exposed in the area between the webbings 38–39 and the bearing ends 37 of the sprocket 36 are designed to catch and drive each of said center portions of the cross treads 40. In the form shown in FIG. 6, a certain reinforcing interior members **40*a*** may be provided on each of the cross treads to insure proper strength and rigidity for such driving motion.

As previously stated, the track section 30 is designed to be free floating within the cavity **27*a* of the U-shaped housing 27. The front end or sprocket driving end of the track 30 is designed to be free floating in the form shown as follows. Front rotatable shaft member 34*a* is provided with extension members 34*b* on the ends thereof which extension members extend outwardly through the side of housing 27. The shaft receiving opening 27*b* through the housing 27 is in the form shown of a substantially arcuate section and shaft 34*b* extends therethrough and is free to oscillate in this arcuate section. Ends 34*b* of shaft 34*a* are pivotally mounted in a first linkage member 42 which linkage member 42 is likewise fixedly attached to the frame 13 of the unit through shaft member 43. This linkage member 42 is then free to oscillate about shaft 43 and therefore a pivot center is defined. In order to maintain driving relationship between the engine power plant and gearing structures 26 and this front drive member 34*a*, a first sprocket member 44 is provided on shaft 43 and power is transmitted from the engine to this sprocket through a first chain member 45. About this first shaft 43 a second drive sprocket 46 driven by sprocket 44 is provided which sprocket 46 in turn is directly connected through a chain member 47 to a final driven sprocket 48 fixedly attached to shaft 34*b***.

As previously stated, links 42 are defined to be mounted on both shaft 43 and shaft **34*b* and therefore with the chain mechanism 47, likewise mounted on both of such shafts, the shaft 34*b* and its attached sprocket members 36, is free to rotate about shaft 43 while maintaining the driving chain 47** in proper tension.

In order to provide adjustability for loads and the like on the front end of the track section 30, a unique adjustable spring mechanism generally designated 50 is provided. In the form shown, a pair of upstanding vertical arm members 51–52 are secured at the midpoints of links 42 and extend upwardly to a cross bar member designated 53. A pair of threaded rod members 54–55 are provided in secure vertical relationship to the housing 27 and the cross bar member 53 is arranged for vertical oscillation thereon. A pair of compression spring members 56–57 are then arranged above cross bar member 53 and below adjustable stop members 58–59 such that through further engagement of the stop members 58–59 on shafts 54–55, additional retarding force may be exerted downwardly on the cross bar 53 to prevent the front of the track section 30 from being driven upwardly into the housing cavity **27*a*** when weight is placed on the vehicle. Actually the ease of adjustment of these units is particularly important and the particular location of the device is as illustrated generally available to the driver of the unit.

Figure 1:
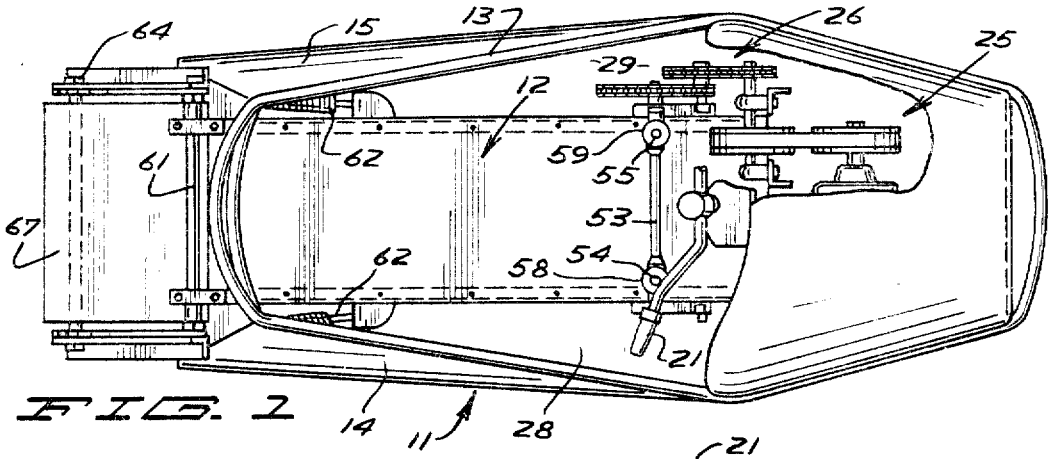
FIG. 1 is a top plan view of a snow vehicle embodying the concepts of applicant's invention with portions thereof broken away to illustrate certain aspects of the invention.
Figure 2:
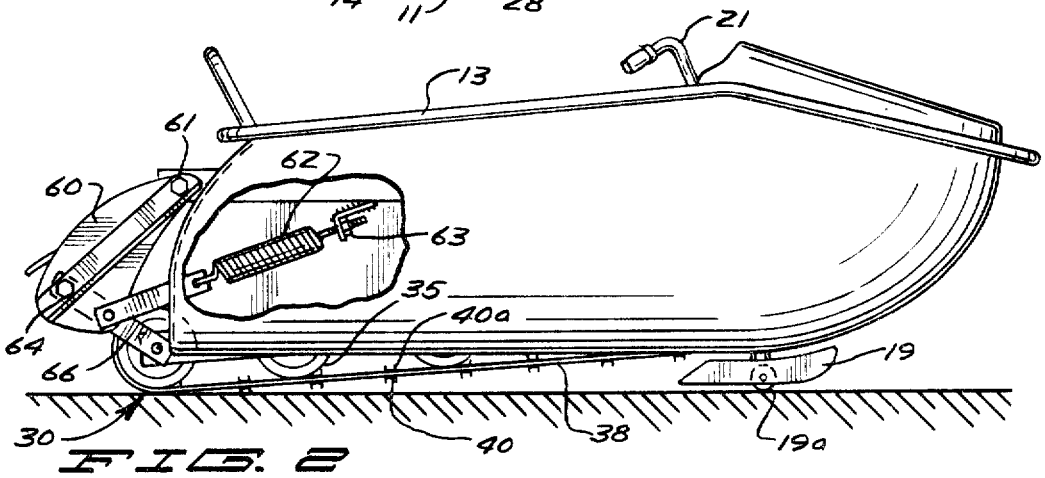
FIG. 2 is an elevation view of the unit illustrated in FIG. 1.
Figure 3:
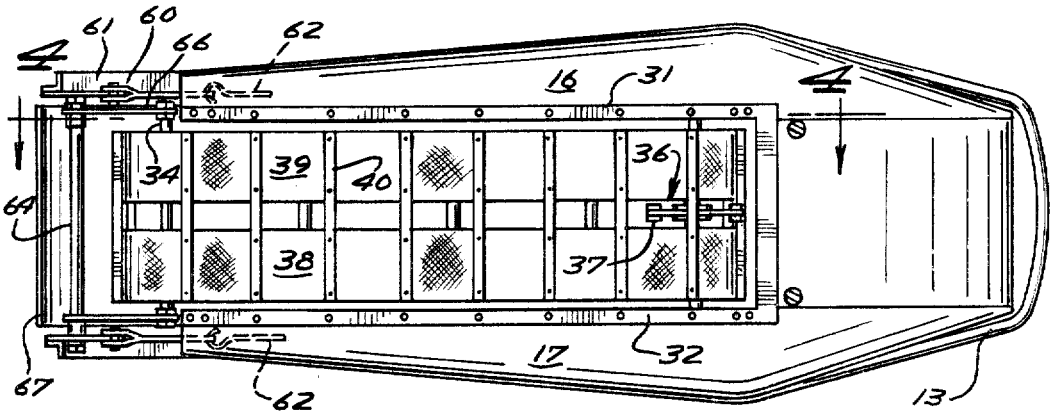
FIG. 3 is a bottom plan view of the unit.
Figure 4:
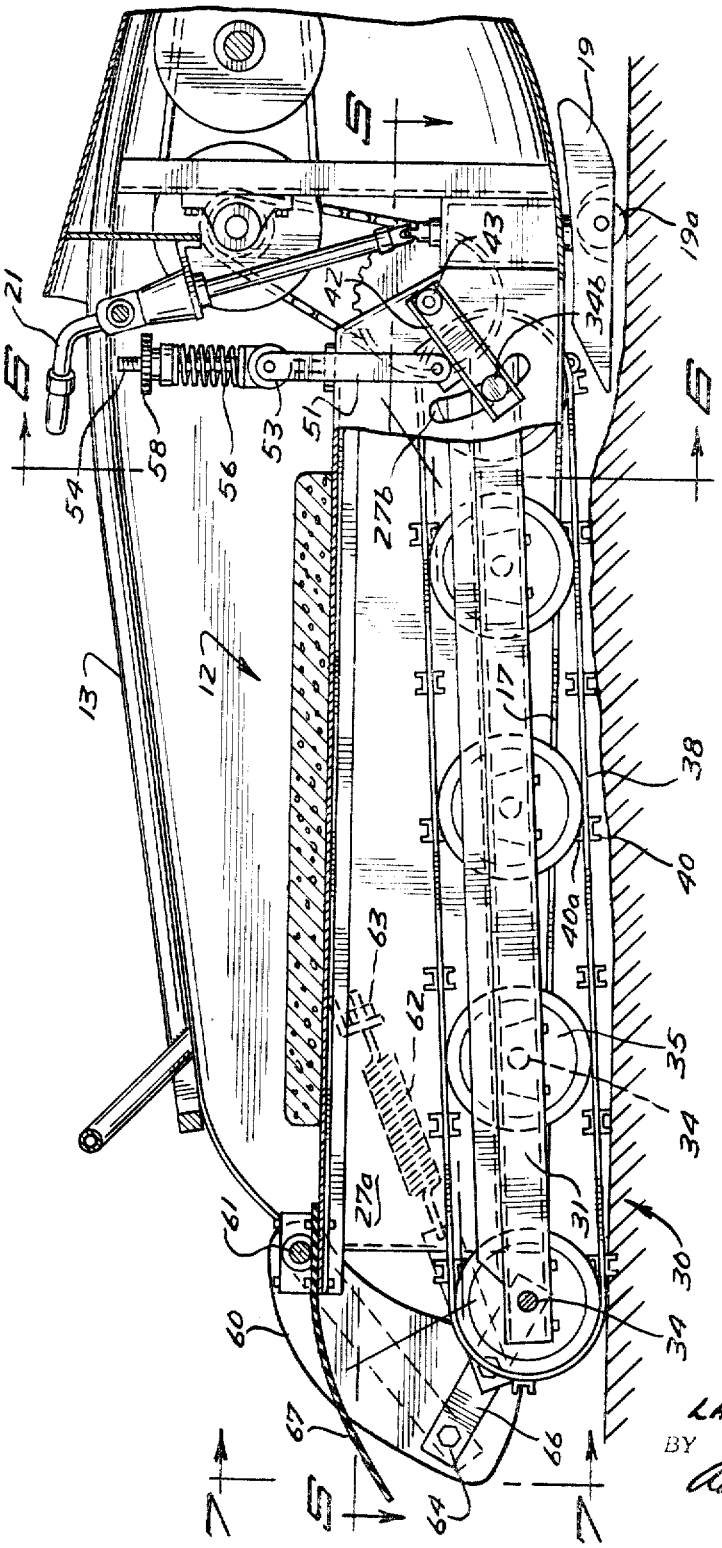
FIG. 4 is a vertical section taken substantially along line 4—4 of FIG. 3.
Figure 5:
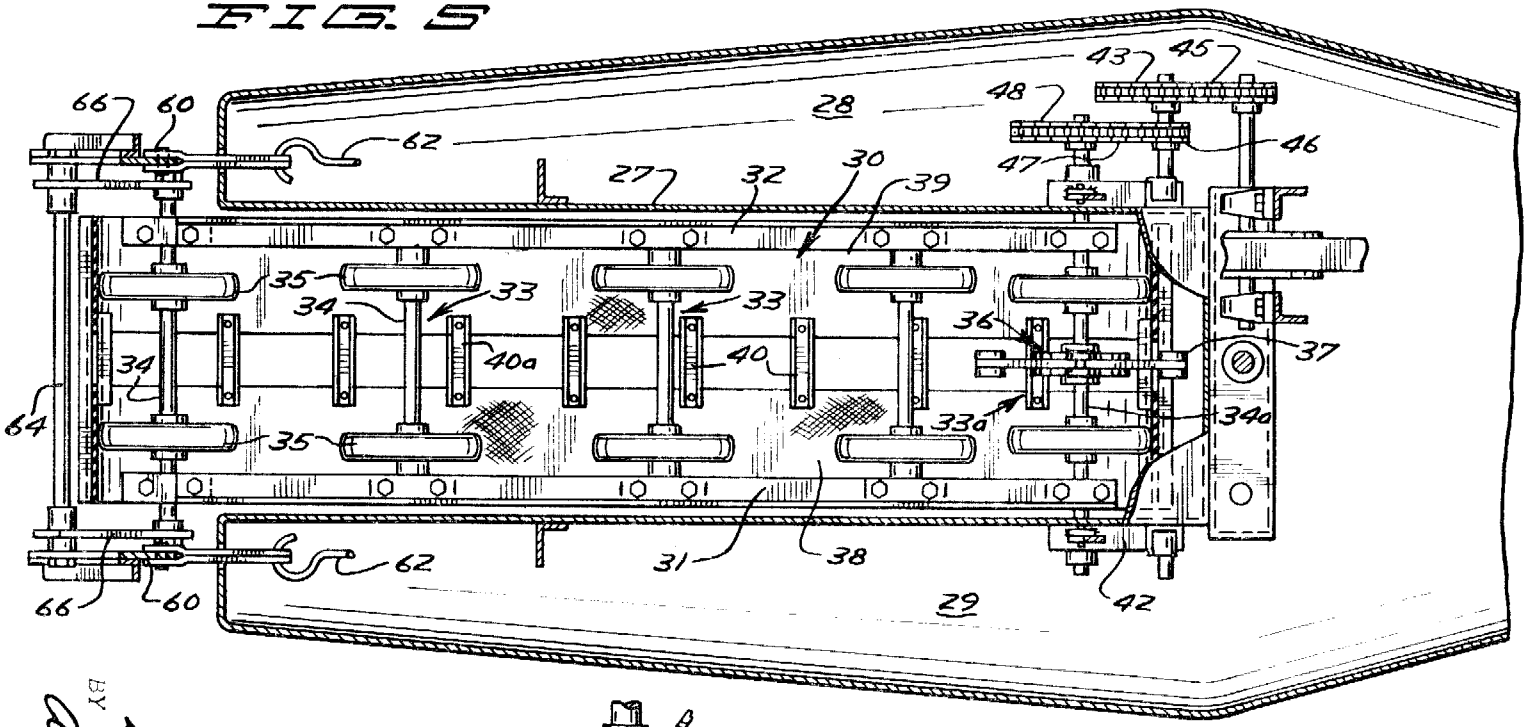
FIG. 5 is a section taken substantially along line 5—5 of FIG. 4 illustrating the track driving mechanism.

In order to afford the same free floating, spring loaded arrangement for the rear of the track system 30, an outwardly extending rear side hinge plate 60 is attached to the body section through a pivot rod 61 and extends downwardly therefrom to provide mounting mechanisms for the rear of the track section 30 and for the spring loaded system connected thereto. As best illustrated in FIG. 2, the position of this rearwardly extending section 60 is controlled through a tension spring member 62 arranged on each side of the unit such that [when the spring 62 is under tension the plate member 60 will extend outwardly rearwardly from the vehicle and the track 30 will be drawn upwardly into the compartment 27a.] *when the track 30 moves upwardly into the housing compartment 27a the spring 62 will then become more tensioned which additional tensioning will normally urge the track 30 downwardly and forwardly.* When the spring member 62 is in its normal unextended position, the track 30 will be forced downwardly and the closure section 60 will swing into close adjacent position at the rear of the vehicle. To obtain this particular arrangement, a first positioning bar 64 is provided to be carried by the rearwardly extending section 60. [and be positioned thereby by spring 62.] A pair of connecting link members 65–66 are arranged to extend downwardly from this bar member 64 and are pivotally attached thereto. The lowermost portions of these connecting links 65–66 are pivotally connected to the rearward wheel shaft 34 of the rear wheel unit 33. The particular situation is best illustrated in FIG. 4 wherein it should be obvious that when the spring 62 is stretched, the rearwardly extending plate 60 will pivot rearwardly about its center 61 and extend rearwardly from the unit thus allowing the link 66 to swing upwardly about axis 64 and bring the rear of the track mechanism 30 into the track receiving compartment 27*a*.

As illustrated, the upper section of the spring 62 may be attached to the body unit through an adjustable connecting device 63 to permit proper tensioning thereof depending upon the weight being carried by the unit. This device in the rear of the track 30 then permits the rearward track section to float in a manner similar to the frontmost section and two arcuate shifting arrangements are established to allow complete free floating of the unit.

A flexible cover member 67 may be provided over the rear of the extending track section such that a snow flap is actually developed for the unit.

The unit then as herein disclosed provides a snow or ice terrain vehicle which includes a completely floating track section. In normal usage, the track will be disposed below the horizontal portions 16–17 of the body but when in deep snow or the like the track naturally will bite into the snow and the sections 16–17 will actually serve as ski sections running adjacent and parallel to the track unit 30. Then added support sections will, of course, add a certain degree of buoyancy to the unit and thus will not permit the unit to sink to a great depth when travelling in snow. The particular body shape and size is also of importance for proper usage in that it is possible to tip the vehicle substantially up on either of the side members 14–15 and still obtain driving relationship between the track and the ground. This then permits a certain degree of tippability without causing a disaster. In actual usage the spring members controlling the vertical position of the track will be adjusted to the proper weight being carried by the unit and will be free to oscillate in accordance with the terrain being crossed while at all times maintaining a high degree of contact between the track and the ground. This, of course, is of particular importance and will result in a positively driven vehicle as well as a vehicle which is particularly comfortable due to the spring load mechanism for the track system.

Another important aspect of the unit itself is the partially enclosed passenger compartment which, of course, affords a certain degree of safety and comfort to the passengers therein.

It will, of course, be understood that various changes may be made in the form, details, arrangements and proportion of parts without departing from the scope of the invention, which generally stated consists in the matter set forth in the appended claims.

What is claimed is:

1. A vehicle particularly designed for travel over ice and snow covered terrain including:

(a) a support frame;

(b) a track housing section mounted on said support frame having a track receiving, downwardly disposed open side extending longitudinally of said vehicle;

(c) a continuous track unit arranged within said housing and extending longitudinally therein having a portion thereof extending below said support frame to provide traction to said device;

(d) a passenger compartment housing arranged on said support frame having a portion thereof arranged adjacent to and extending laterally from each side of the track receiving open side of said track housing to provide a longitudinal support surface the length of said housing with side members extending upwardly therefrom to provide a passenger compartment along the length above said track housing section;

(e) means for driving said track unit to supply moving force to the vehicle;

(f) means for steering and controlling the direction of the vehicle.

2. The structure set forth in claim 1 and means for mounting said continuous track unit for oscillation into and out of said housing.

3. The structure set forth in claim 2 wherein said oscillation mounting means includes means for spring loading at least the forward portion of said track unit including means for adjusting the tension on the spring loading means to compensate for the weight being carried by the vehicle.

4. The structure set forth in claim 3 wherein said means for mounting said track unit include independent spring loaded mounting mechanisms on both the front and rear portions of said track unit with means for adjusting said spring loaded mechanisms independently of one another.

5. The structure set forth in claim 1 wherein said steering and controlling means includes substantially narrow ski elements controllably and rotatably mounted at the forward end of said vehicle.

6. The structure set forth in claim 1 wherein said passenger housing includes selected portions arranged adjacent to and extending forwardly and upwardly from the track receiving open side of said track housing to provide with said laterally and upwardly extending portions a substantially enclosed passenger compartment.

*7. A snow vehicle free floating track mounting arrangement including:*

*(a) an inverted generally U-shaped housing;*

*(b) a track section arranged in vertical oscillating relation in said housing including:*

*(1) a continuous track member;*

*(2) at least one forwardmost and rearwardmost longitudinally spaced track engaging rotatable support member, each including laterally extending axle members;*

*(c) means for mounting the forwardmost lateral axle in vertically shiftable position including:*

*(1) a pair of pivotally mounted arm members engaging the ends of said forwardmost axle to permit vertical swinging movement thereof;*

*(2) means for normally urging said arms downwardly; and*

*(d) means for mounting the rearwardmost lateral axle, in vertically shiftable position with respect to said housing, including:*

*(1) pivotally mounted link means engaging the ends of said axle, and*

*(2) means for normally urging said links downwardly.*

*8. The srtucture set forth in claim 7 wherein said rear axle mounting link means includes:*

*(a) a pair of first arm elements pivotally mounted above said rear axle; and*

*(b) a pair of second arm elements engaging the free end of said first arms and engaging the ends of said axle.*

*9. The structure set forth in claim 8 and spring means normally urging said track section downwardly out of said housing.*

*10. The structure set forth in claim 9 and said spring member engaging one of said arms to urge said section downwardly.*

*11. The structure set forth in claim 10 and said spring member arranged and constructed to urge said section downwardly and forwardly.*

*12. The structure set forth in claim 11 and said spring means including means for adjusting the tension thereof.*

*13. The structure set forth in claim 7 and said forward axle urging means including:*

*(a) a bifurcated arm structure extending downwardly to pivotally engage said pivotally mounted arm members; and*

*(b) spring means normally urging said bifurcated arm structure downwardly.*

*14. The structure set forth in claim 13 and means for adjusting said spring means.*

*15. The structure set forth in claim 7 wherein:*

(*a*) *said pivotally mounted arm members are mounted on a common rotational center;*

(*b*) *first drive means located on said center;*

(*c*) *driven means carried by said axle; and*

(*d*) *driving connection between said drive means and said driven means.*

*16. The structure set forth in claim 7 and a frame member arranged and constructed to carry said track engaging elements in longitudinally spaced arrangement.*

References Cited

The following references, cited by the Examiner, are of record in the patented file of this patent or the original patent.

UNITED STATES PATENTS

| | | | |
|---|---|---|---|
| 2,339,886 | 1/1944 | Shannon | 180—5 |
| 2,656,904 | 10/1953 | Grenier | 180—5 |
| 2,970,662 | 2/1961 | Hetteen | 180—5 |
| 3,023,824 | 3/1962 | Bombardier | 180—5 X |
| 3,140,752 | 7/1964 | Feu | 180—9.52 X |

RICHARD J. JOHNSON, Primary Examiner

U.S. Cl. X.R.

180—9.24, 9.54; 305—29